United States Patent
You et al.

(10) Patent No.: US 11,281,033 B2
(45) Date of Patent: Mar. 22, 2022

(54) DISPLAY SYSTEM AND DISPLAY CONTROL METHOD THEREFOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Yang You, Beijing (CN); Yun Qiu, Beijing (CN); Ruizhi Yang, Beijing (CN); Ruiyong Wang, Beijing (CN); Zhidong Wang, Beijing (CN); Zhenhua Lv, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 56 days.

(21) Appl. No.: 16/607,948

(22) PCT Filed: Apr. 1, 2019

(86) PCT No.: PCT/CN2019/080820
§ 371 (c)(1),
(2) Date: Oct. 24, 2019

(87) PCT Pub. No.: WO2019/192428
PCT Pub. Date: Oct. 10, 2019

(65) Prior Publication Data
US 2021/0109388 A1   Apr. 15, 2021

(30) Foreign Application Priority Data
Apr. 3, 2018   (CN) .......................... 201810290535.5

(51) Int. Cl.
*G02F 1/133* (2006.01)
*G02B 30/31* (2020.01)
(Continued)

(52) U.S. Cl.
CPC ......... *G02F 1/13306* (2013.01); *G02B 30/31* (2020.01); *G02F 1/1323* (2013.01);
(Continued)

(58) Field of Classification Search
CPC ........................... G02F 1/1323; G02F 1/13725
See application file for complete search history.

(56) References Cited

U.S. PATENT DOCUMENTS 5,305,126 A * 4/1994 Kobayashi ......... C09K 19/3852
349/94
2004/0257531 A1* 12/2004 Hattori ................... H04N 13/31
353/10
(Continued)

FOREIGN PATENT DOCUMENTS

| CN | 1804681 A | 7/2006 |
|---|---|---|
| CN | 201107472 Y | 8/2008 |

(Continued)

OTHER PUBLICATIONS

Chinese Office Action in Corresponding Chinese Application No. 201810290535.5 dated Jun. 10, 2020 (an English translation attached hereto). 18 pages.
(Continued)

*Primary Examiner* — Alexander P Gross
(74) *Attorney, Agent, or Firm* — Leason Ellis LLP

(57) ABSTRACT

A display system and a display control method of the display system are provided. The display system includes a display device, at least two layers of liquid crystal cells on a light-emitting side of the display device, and a controller device. The display device is configured to display a display picture; the at least two layers of liquid crystal cells are configured to control an exit angle of light of the display picture; the controller device is configured to control positions and/or widths of light-transmitting regions and light-
(Continued)

shielding regions of each layer of the liquid crystal cells to control a display mode of the display picture. The display system can control the positions and widths of the light-transmitting regions and the light-shielding regions formed on each liquid crystal cell according to actual needs, thereby realizing switching among various display modes.

15 Claims, 8 Drawing Sheets

(51) Int. Cl.
  *G02F 1/13* (2006.01)
  *G02F 1/1343* (2006.01)
  *G02F 1/1347* (2006.01)
  *G02F 1/137* (2006.01)

(52) U.S. Cl.
  CPC ........ *G02F 1/1347* (2013.01); *G02F 1/13439* (2013.01); *G02F 1/13725* (2013.01)

(56) References Cited

U.S. PATENT DOCUMENTS

| | | |
|---|---|---|
| 2007/0152998 A1 | 7/2007 | Ahn et al. |
| 2007/0159566 A1 | 7/2007 | Kang |
| 2008/0013003 A1 | 1/2008 | Soh |
| 2011/0090414 A1 | 4/2011 | Hsu et al. |
| 2011/0157339 A1* | 6/2011 | Bennett .................. G09G 3/003 348/59 |
| 2013/0057790 A1* | 3/2013 | Xu ...................... G02F 1/13306 349/15 |
| 2016/0033778 A1* | 2/2016 | Lin ........................ H04N 13/31 359/462 |
| 2016/0266394 A1 | 9/2016 | Fan |
| 2016/0275875 A1 | 9/2016 | Wei |
| 2017/0248829 A1* | 8/2017 | Koito .................... G02F 1/1323 |
| 2018/0144671 A1* | 5/2018 | Li ............................ G09G 3/36 |

FOREIGN PATENT DOCUMENTS

| | | |
|---|---|---|
| CN | 101387775 A | 3/2009 |
| CN | 103399427 A | 11/2013 |
| CN | 103499898 A | 1/2014 |
| CN | 103885229 A | 6/2014 |
| CN | 104020624 A | 9/2014 |
| CN | 204009309 U | 12/2014 |
| CN | 104732168 A | 6/2015 |
| CN | 106646954 A | 5/2017 |
| CN | 108490703 A | 4/2018 |

OTHER PUBLICATIONS

Chinese Office Action in corresponding Chinese Application No. 201810290535.5 dated Mar. 4, 2020 (an English translation attached hereto). 15 pages.

* cited by examiner

DISPLAY SYSTEM AND DISPLAY CONTROL METHOD THEREFOR

CROSS-REFERENCE TO RELATED PATENT APPLICATIONS

This application is a U.S. National Stage Applications under 35 U.S.C. § 371 of International Patent Application No. PCT/CN2019/080820, filed Apr. 1, 2019, which claims the benefit of Chinese patent application No. 201810290535.5 filed on Apr. 3, 2018, both of which are incorporated by reference in their entireties as a part of the present application.

TECHNICAL FIELD

Embodiments of the present disclosure relate to a display system and a display control method of the display system.

BACKGROUND

With the continuous development of display technology, two-dimensional plane display can no longer meet people's needs. People hope to restore the three-dimensional information presented by a display picture more truly, so a three-dimensional display technology emerge as the times require. In addition, in viewing important display contents, a user does not want others to view the information of the display picture, and at this time, the display device is required to have an anti-peep function.

SUMMARY

At least one embodiment of the present disclosure provides a display system, which includes a display device, at least two layers of liquid crystal cells on a light-emitting side of the display device, and a controller device. The display device is configured to display a display picture; the at least two layers of liquid crystal cells are configured to control an exit angle of light of the display picture; and the controller device is configured to control positions and/or widths of both light-transmitting regions and light-shielding regions in each layer of liquid crystal cell among the at least two layers of liquid crystal cells to control a display mode of the display picture.

For example, in the display system provided by some embodiments of the present disclosure, each layer of liquid crystal cell includes: two transparent electrode layers opposite to each other and a liquid crystal layer between the two transparent electrode layers; each of the two transparent electrode layers opposite to each other includes a driving electrode, and the driving electrode is configured to be applied with an electrical signal to control the liquid crystal layer corresponding to the driving electrode to switch between a light-transmitting state and an opaque state, and to form the light-transmitting regions and the light-shielding regions of each layer of liquid crystal cell.

For example, in the display system provided by some embodiments of the present disclosure, the driving electrode includes a plurality of strip electrodes extending in a same direction.

For example, in the display system provided by some embodiments of the present disclosure, the liquid crystal layer is a polymer liquid crystal layer including a black dye; the polymer liquid crystal layer including the black dye is in the light-transmitting state in a situation of being applied without an electric field, and is in the opaque state in a situation of being applied with an electric field.

For example, in the display system provided by some embodiments of the present disclosure, a set interval is between the display device and the at least two layers of liquid crystal cells and a set interval is between layers of liquid crystal cells.

For example, in the display system provided by some embodiments of the present disclosure, the display device includes a backlight module and a display panel on a light-emitting side of the backlight module; the at least two layers of liquid crystal cells are both on a side of the display panel facing away from the backlight module or both between the backlight module and the display panel.

For example, in the display system provided by some embodiments of the present disclosure, the display device is an organic light-emitting diode display device or a liquid crystal display device.

For example, in the display system provided by some embodiments of the present disclosure, the controller device is configured to control the at least two layers of liquid crystal cells to be in a light-transmitting state so that the display mode is two-dimensional plane display.

For example, in the display system provided by some embodiments of the present disclosure, the controller device is configured to control the at least two layers of liquid crystal cells to form the light-transmitting regions and the light-shielding regions, the light-transmitting regions and the light-shielding regions are alternately arranged, and orthographic projections of the light-transmitting regions in different layers of liquid crystal cells of the at least two layers of liquid crystal cells on a display surface of the display device do not completely overlap each other, so that the display mode is three-dimensional stereoscopic display.

For example, in the display system provided by some embodiments of the present disclosure, in a situation where the display system comprises three layers of liquid crystal cells, the controller device is configured to control widths of light-transmitting regions of a liquid crystal cell in an intermediate layer to be larger than widths of light-transmitting regions of liquid crystal cells in two layers other than the intermediate layer, and to control widths of light-shielding regions of the liquid crystal cell in the intermediate layer to be larger than widths of light-shielding regions of the liquid crystal cells in the two layers other than the intermediate layer, the orthographic projections of light-transmitting regions of liquid crystal cells in two layers, which are adjacent to each other, on the display surface of the display device do not completely overlap each other.

For example, in the display system provided by some embodiments of the present disclosure, the controller device is configured to control the at least two layers of liquid crystal cells to form the light-transmitting regions and the light-shielding regions, the light-transmitting regions and the light-shielding regions are alternately arranged, and each liquid crystal cell, except for the at least two layers of liquid crystal cells, is in a completely light-transmitting state, and overlapping regions are between orthographic projections of the light-transmitting regions in different layers of liquid crystal cells of the at least two layers of liquid crystal cells on a display surface of the display device, so that the display mode is anti-peep display.

For example, in a situation where the display system comprises three layers of liquid crystal cells, the controller device is configured to control a liquid crystal cell in an intermediate layer to be in the completely light-transmitting state, so that each of the liquid crystal cells in two layers other than the intermediate layer comprises the light-transmitting regions and the light-shielding regions, the light-transmitting regions and the light-shielding regions are alternately arranged, and the orthographic projections of the light-transmitting regions of the liquid crystal cells in the two layers other than the intermediate layer on the display surface of the display device exactly completely overlap each other.

At least one embodiment of the present disclosure also provides a display control method of the display system, which includes: receiving a switching instruction from a user and determining the display mode to which the display system needs to be switched; and controlling an electrical signal applied to respective driving electrodes of each liquid crystal cell according to the display mode which is determined, to switch the display system to the display mode indicated by the switching instruction.

For example, in the display control method provided by some embodiments of the present disclosure, in a situation where the display mode, to which the display system needs to be switched, is two-dimensional plane display, controlling the electrical signal applied to the respective driving electrodes of each liquid crystal cell includes: controlling the electric signal applied to the respective driving electrodes so that respective liquid crystal cells are in a light-transmitting state.

For example, in the display control method provided by some embodiments of the present disclosure, in a situation where the display mode, to which the display system needs to be switched is three-dimensional stereoscopic display, controlling the electrical signal applied to the respective driving electrodes of each liquid crystal cell includes: controlling the electrical signal applied to the respective driving electrodes, so that each of the at least two layers of liquid crystal cells forms the light-transmitting regions and the light-shielding regions, the light-transmitting regions and the light-shielding regions are alternately arranged; and controlling each liquid crystal cell to switch between a left-eye mode and a right-eye mode at a set frequency that cannot be distinguished by a human eye. In the left-eye mode and the right-eye mode, orthographic projections of the light-transmitting regions in different layers of liquid crystal cells of the at least two layers of liquid crystal cells on a display surface of the display device do not completely overlap each other.

For example, in the display control method provided by some embodiments of the present disclosure, in the left-eye mode, a region covered by emitted light of the display device at least partially overlaps a visible range of a left eye and does not overlap a visible range of a right eye; in the right-eye mode, the region covered by the emitted light of the display device at least partially overlaps the visual range of the right eye and does not overlap the visual range of the left eye.

For example, in the display control method provided by some embodiments of the present disclosure, in a situation where the display mode, to which the display system needs to be switched is anti-peep display, controlling the electrical signal applied to the respective driving electrodes of each liquid crystal cell includes: controlling the electrical signal applied to the respective driving electrodes, so that each of the at least two layers of liquid crystal cells forms the light-transmitting regions and the light-shielding regions, the light-transmitting regions and the light-shielding regions are alternately arranged, and each liquid crystal cell, except for the at least two layers of the liquid crystal cells, is in a completely light-transmitting state. Overlapping regions are between orthographic projections of the light-transmitting regions in different layers of liquid crystal cells of the at least two layers of liquid crystal cells on a display surface of the display device.

For example, in the display control method provided by some embodiments of the present disclosure, in a situation where the display system includes three layers of liquid crystal cells and the display system is used for three-dimensional stereoscopic display, controlling the electrical signal applied to the respective driving electrodes of each liquid crystal cell includes: controlling the electrical signal applied to the respective driving electrodes so that respective liquid crystal cells form the light-transmitting regions and the light-shielding regions, the light-transmitting regions and the light-shielding regions are alternately arranged. Widths of light-transmitting regions of a liquid crystal cell in an intermediate layer is larger than widths of the light-transmitting regions of liquid crystal cells in two layers other than the intermediate layer, widths of light-shielding regions of the liquid crystal cell in the intermediate layer is larger than widths of light-shielding regions of the liquid crystal cells in the two layers other than the intermediate layer; and orthographic projections of the light-transmitting regions of liquid crystal cells in two layers, which are adjacent to each other, on a display surface of the display device do not completely overlap each other.

For example, in the display control method provided by some embodiments of the present disclosure, in a situation where the display system includes three layers of liquid crystal cells and the display system is used for anti-peep display, controlling the electrical signal applied to the respective driving electrodes of each liquid crystal cell includes: controlling the electrical signal applied to the respective driving electrodes, so that a liquid crystal cell in an intermediate layer to be in a completely light-transmitting state, and that each of liquid crystal cells in two layers other than the intermediate layer comprises the light-transmitting regions and the light-shielding regions, the light-transmitting regions and the light-shielding regions are alternately arranged. Orthographic projections of the light-transmitting regions of the liquid crystal cells in the two layers other than the intermediate layer on a display surface of the display device exactly completely overlap each other.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
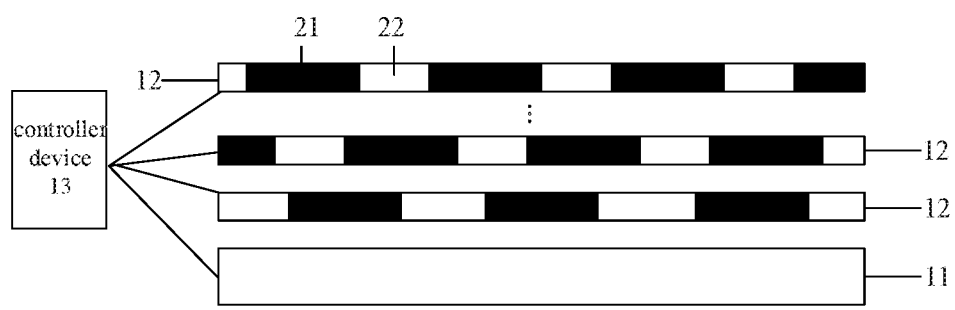
FIG. 1 is a structural schematic diagram of a display system provided by some embodiments of the disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, a common display device may only have one of functions such as three-dimensional display or anti-peep display, and may not have multiple functions at the same time. However, with the diversification of applications of the display device and people's higher requirements for the display device, how to enable the display device have multiple functions for multiple applications has become an urgent problem to be solved.

At least one embodiment of the present disclosure provides a display system, which includes a display device, at least two layers of liquid crystal cells on a light-emitting side of the display device and a controller device. The display device is configured to display a display picture; the at least two layers of liquid crystal cells are configured to control an exit angle of light of the display picture; and the controller device is configured to control positions and/or widths of both light-transmitting regions and light-shielding regions of each layer of liquid crystal cell in the at least two layers of liquid crystal cells to control a display mode of the display picture. At least one embodiment of the present disclosure also provides a display control method corresponding to the above display system.

The display system and the display control method of the display device provided by the above embodiment of the present disclosure have a plurality of display modes such as two-dimensional plane display, three-dimensional stereoscopic display, anti-peep display and the like, and can be switched between the plurality of display modes according to the requirements of actual application scenes.

The display system and the display control method of the display system provided by some embodiments of the present disclosure will be described in detail below with reference to the accompanying drawings.

As shown in FIG. 1, a display system provided by some embodiments of the present disclosure includes a display device 11, at least two layers of liquid crystal cells 12 on a light-emitting side of the display device 11 and a controller device 13. For example, the display device is configured to display a display picture; the at least two layers of liquid crystal cells 12 are configured to control an exit angle of light of the display picture; the controller device 13 is configured to control positions and/or widths of both light-transmitting regions 22 and light-shielding regions 21 of each layer of liquid crystal cell 12 to control a display mode of the display picture. For example, a light-transmitting region 22 is represented by a white rectangle and a light-shielding region 21 is represented by a black rectangle. The following embodiment is the same as this case and will not be described again.

For example, the display mode may be three-dimensional stereoscopic display, two-dimensional plane display, anti-peep display, or the like. For example, a human eye views the display picture through the liquid crystal cells on the display device 11, so that the display mode of the display picture viewed by the human eye can be controlled by adjusting a light-transmitting angle of the liquid crystal cells 12 through the controller device 13, thereby enabling the display system to have various display modes for various application scenes.

For example, a set interval is between the display device 11 and the liquid crystal cell 12 and a set interval is among respective layers of liquid crystal cells 12. For example, the set intervals may be set according to a function to be realized, and the embodiments of the present disclosure are not limited to this case.

It should be noted that in some embodiments of the present disclosure, the display device 11 includes, for example, 2 layers of liquid crystal cells, 3 layers of liquid crystal cells, 4 layers of liquid crystal cells or more layers of liquid crystal cells, and the specific arrangement may depend on the actual situation, and the embodiments of the present disclosure are not limited thereto.

Figure 2:
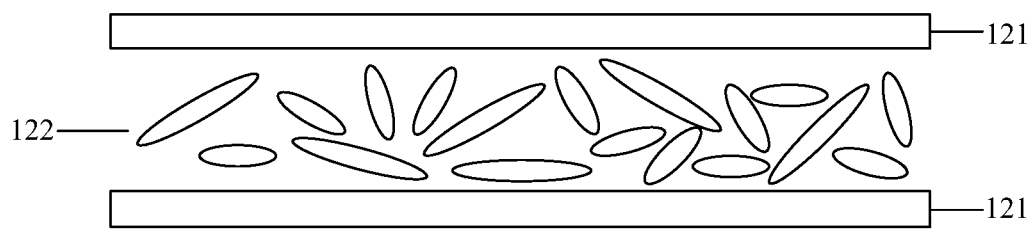
FIG. 2 is a cross-sectional structural schematic diagram of a liquid crystal cell provided by some embodiments of the disclosure.

For example, as shown in FIG. 2, each layer of liquid crystal cell 12 includes two transparent electrode layers 121 opposite to each other and a liquid crystal layer 122 between the two transparent electrode layers 121. For example, in some embodiments of the present disclosure, a material of the transparent electrode layers 121 opposite to each other may be the same or different, may include a transparent material such as a glass substrate, a resin substrate or any combination of the glass substrate and the resin substrate, and the embodiments of the present disclosure are not limited thereto.

Figure 3A:
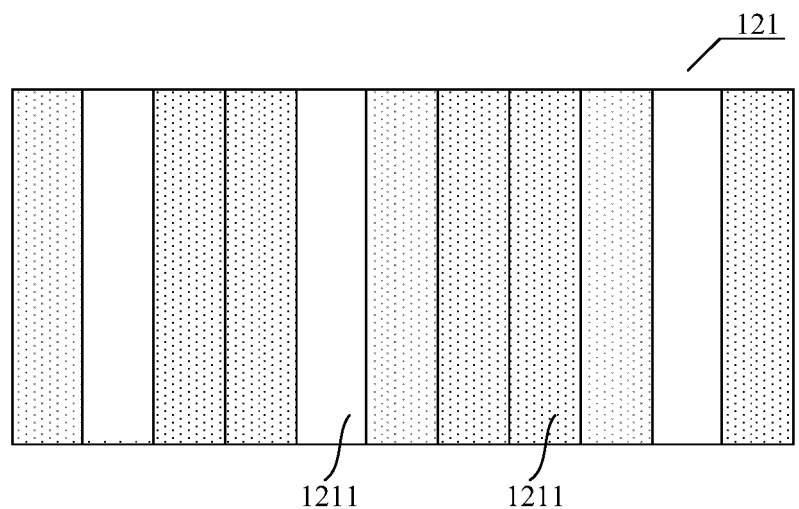
FIG. 3A is a schematic top view of a transparent electrode layer provided by some embodiments of the present disclosure.
Figure 3B:
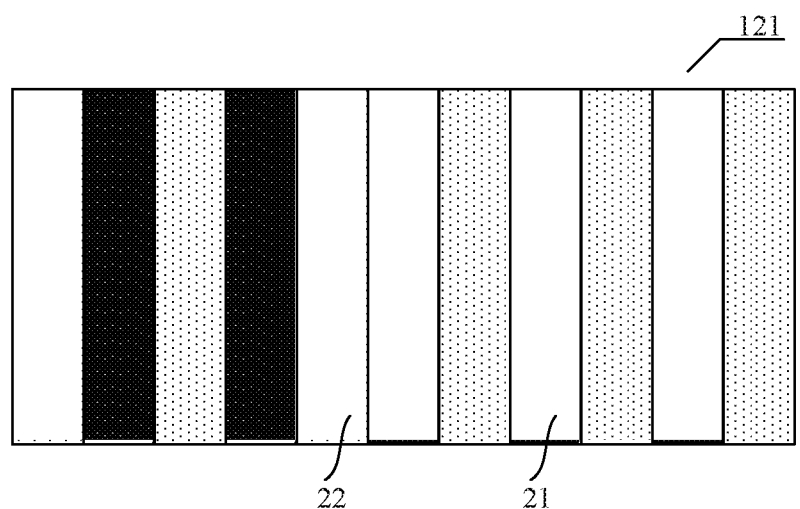
FIG. 3B is a schematic top view of a grating provided by some embodiments of the present disclosure.

For example, as shown in FIG. 3A, each of the two transparent electrode layers 121 opposite to each other includes a driving electrode 1211. For example, the driving electrode 1211 may be configured to be applied with an electrical signal to control the liquid crystal layer corresponding to the driving electrode 1222 to switch between a light-transmitting state and an opaque state, so that a corresponding light-transmitting regions and light-shielding regions are formed on the liquid crystal cell. For example, a region, where the liquid crystal layer is in the light-transmitting state, corresponds to a light-transmitting region of the liquid crystal cell, and a region, where the liquid crystal layer is in the opaque state, corresponds to the light-shielding region of the liquid crystal cell. For example, in some examples, the driving electrode 1211 includes a plurality of strip electrodes extending in a same direction; and in other examples, for example, the driving electrode 1211 included in one transparent electrode layer may be a planar electrode, and the driving electrode 1211 included in the other transparent electrode layer may include the strip electrodes, so that a grating structure as shown in FIG. 3B is formed under control of the driving electrodes included in the transparent electrode layers. For example, the grating structure includes the light-transmitting regions 22 and the light-shielding regions 21, and the light-transmitting regions and the light-shielding regions are alternately arranged. It should be noted that the driving electrode 1211 may be an electrode of other shape capable of forming a grating, such as a rhombus, etc. The embodiments of the present disclosure are not limited thereto. The following description will be given by taking a case that the driving electrodes 1211 all include the strip electrodes as an example.

For example, the strip electrodes 1211 included in each transparent electrode layer 121 may be arranged transversely or longitudinally, and the arrangement direction of the strip electrodes is not limited thereto, as long as it is satisfied that overlapping portions are between the strip electrodes 1211 included in the transparent electrode layers 121 to form an electric field that controls deflection of liquid crystal molecules 201, so as to form the grating. For example, a material of the strip electrodes 1211 may be a transparent conductive material. For example, the transparent conductive material may be a material including a transparent metal oxide such as indium tin oxide (ITO) or indium zinc oxide (IZO) or the like, and the embodiments of the present disclosure are not limited thereto.

For example, in some examples, the strip electrodes 1211 are connected with the controller device 13 respectively through terminals (not shown in FIGS. 1-3) on a left side and a right side of each transparent electrode layer 121 and conductive wires (not shown in the figures) connected with the terminals, so that an electrical signal is applied to the strip electrodes 1211 of each liquid crystal cell to generate an electric field between the strip electrodes opposite to each other, and thus each liquid crystal cell exhibits strip light-transmitting regions and strip light-shielding regions, in a same regular arrangement or different regular arrangements. For example, the display system can be used for the two-dimensional plane display, the three-dimensional stereoscopic display and the anti-peep display respectively by adjusting an interval between the liquid crystal cells and the positions and/or the widths of both the light-transmitting regions and the light-shielding regions in the liquid crystal cells. According to actual needs, each liquid crystal cell can be adjusted according to the state of the liquid crystal cell corresponding to the required display mode, thus realizing free switching between different display modes.

For example, the light-shielding region may include at least one strip electrode. For example, a width and position of the light-shielding region may be controlled by controlling a number and position of the strip electrodes included in the light-shielding region. For example, by applying the electrical signal to any combination of the strip electrodes arranged continuously through the controller device, light-shielding regions having different positions and widths can be formed, thereby realizing different display modes. The following examples are the same and will not be described again.

Figure 4A:
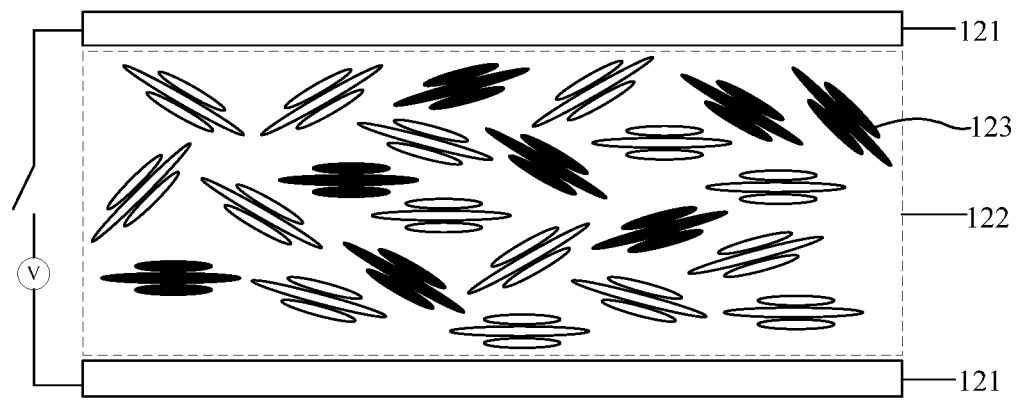
FIG. 4A is a working schematic diagram of a liquid crystal cell provided by some embodiments of the disclosure.
Figure 4B:
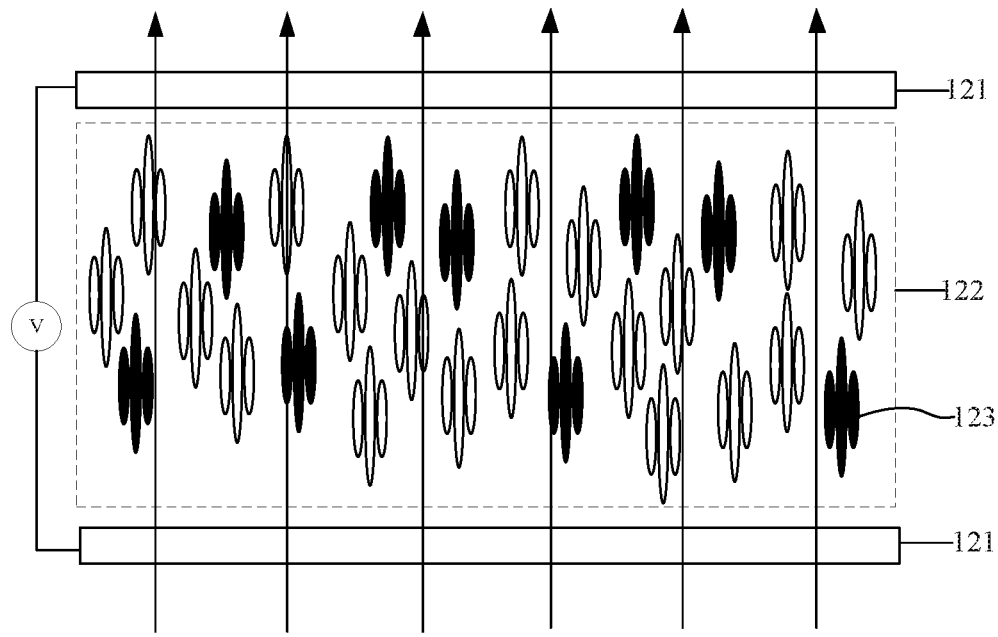
FIG. 4B is a working schematic diagram of a liquid crystal cell provided by other embodiments of the disclosure.

For example, in some examples, as shown in FIGS. 4A and 4B, the above-mentioned liquid crystal layer 122 may adopt a polymer liquid crystal layer including a black dye 123. For example, the black dye has dichroism, has the same properties as the liquid crystal molecules, and can exhibit different arrangement modes under an action of the electric field.

For example, as shown in FIG. 4A, in a state where no electric field is applied, direction vectors (long axis direction) of black dye molecules in the polymer liquid crystal layer including the black dye and direction vectors (long axis direction) of the liquid crystal molecules are randomly distributed, so the liquid crystal cell is in the light-transmitting state. As shown in FIG. 4B, in a state where the electric field (e.g., a threshold voltage applied) is applied (e.g., an arrow direction in FIG. 4B is a direction of the electric field), the direction vectors of the black dye molecules in the polymer liquid crystal layer including the black dye and the direction vectors of the liquid crystal molecules are parallel to the direction of the electric field, while the dye molecules present a color obviously color in the long axis direction and appear black, so the liquid crystal cell is in the opaque state under the action of the electric field.

For example, in some embodiments of the present disclosure, the controller device 13 may be any one of various devices that can realize a control function, such as a central processing unit (CPU), a data signal processor (DSP) or the like, or may be realized by a semiconductor chip, a field programmable gate array (FPGA) or the like.

For example, the controller device 13 may include a processor and a storage device (not shown in the figure). The processor may be a central processing unit (CPU) or other form of processing unit having a data processing capability and/or an instruction execution capability, may be a general purpose processor or a special purpose processor, or may be a processor based on X86 or ARM architecture, or the like. The storage device may include one or more computer program products, which may include various forms of computer readable storage media, such as a volatile memory and/or a nonvolatile memory. The volatile memory may include, for example, a random access memory (RAM) and/or a cache, etc. The nonvolatile memory may include, for example, a read only memory (ROM), a hard disk, a flash memory, and the like. One or more computer program instructions may be stored in the computer readable storage medium, and the processor may execute the program instructions to implement the functions described in the embodiments of the present disclosure (implemented by the processor) and/or other desired functions. Various application programs and various data may also be stored in the computer readable storage medium.

Figure 5A:
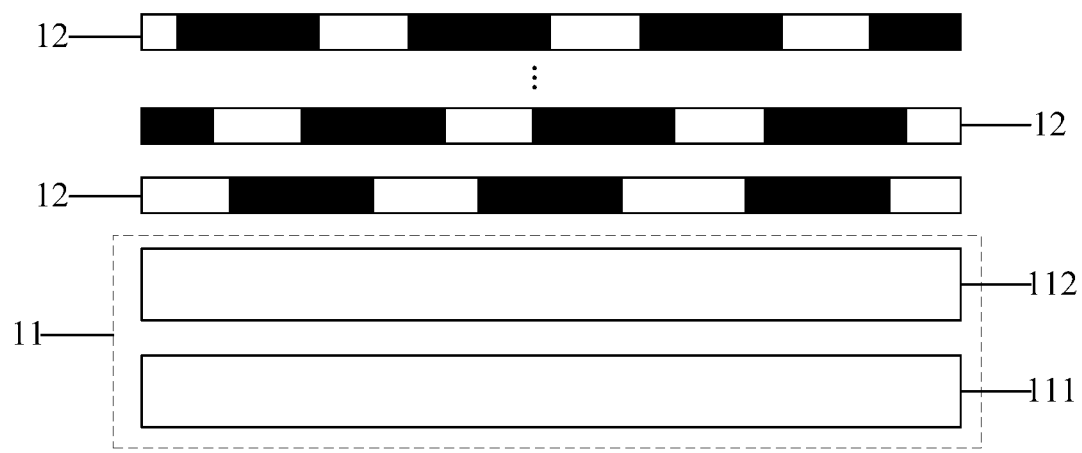
FIG. 5A is a structural schematic diagram of a display system provided by other embodiments of the disclosure.
Figure 5B:
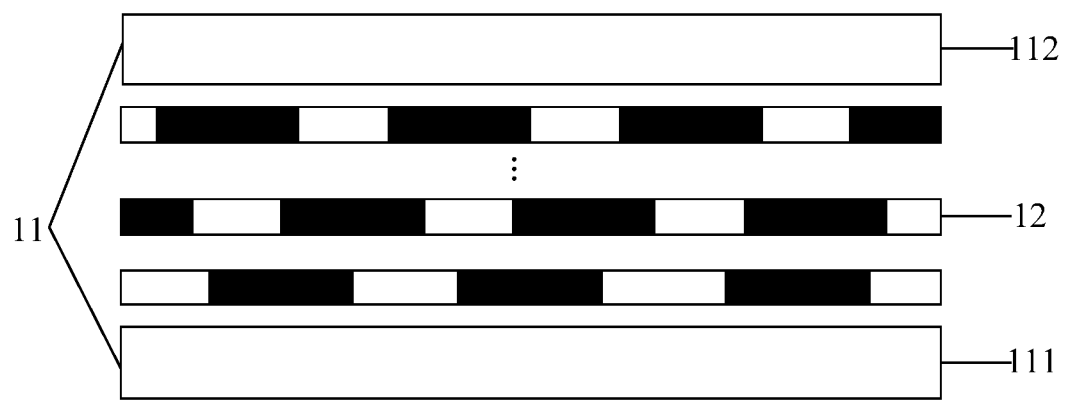
FIG. 5B is a structural schematic diagram of a display system provided by still other embodiments of the disclosure.

For example, in practical applications, the display device 11 in the display system provided by some embodiments of the present disclosure may adopt any one of display devices of various forms, and the embodiments of the present disclosure are not limited thereto. For example, as shown in FIGS. 5A and 5B, the display device 11 may further include a backlight module 111 and a display panel 112 on the light-emitting side of the backlight module 111. In a situation where the display device 11 is a display device in which a light source is provided by the backlight module 111, the multiple layers of liquid crystal cells 12 may be on a side of the display panel 112 facing away from the backlight module 111 (as shown in FIG. 5A), or may be between the backlight module 111 and the display panel 112 (as shown in FIG. 5B).

It should be noted that in a situation where the multiple layers of liquid crystal cells are arranged at different positions in the display system, as shown in FIG. 5A or FIG. 5B, because distances from the multiple layers of liquid crystal cells to a display surface of the display panel are different, the interval between the liquid crystal cells and the positions and/or widths of both the light-transmitting regions 22 and the light-shielding regions 21 in each liquid crystal cell can be adjusted accordingly according to actual application requirements, to realize the function that the display system can be freely switched among various display modes according to actual conditions.

For example, in some examples, the display device 11 may be a liquid crystal display device. Accordingly, the display panel may be a liquid crystal display panel. It should be noted that in other examples, the display device may be a self-luminous display device, for example, the display device may be an organic light-emitting diode (OLED) display device, and the embodiments of the present disclosure are not limited thereto.

For example, in some examples, the display device 11 may adopt any other type of display device. The multiple layers of liquid crystal cells need to be on the light-emitting side of the display device 11 or the display panel 112, and its principle of switching among display modes is similar to the above two types of display devices, and will not be described here again. Display devices adopting the concept of the present disclosure to realize switching among display modes all belong to the protection scope of the present disclosure.

The display system provided by the above embodiments of the present disclosure can control and apply the electric signal to the strip electrodes of each liquid crystal cell according to actual needs, so as to control the positions and widths of the light-transmitting regions and the light-shielding regions formed on each liquid crystal cell, and thus to realize switching among various display modes.

Figure 6:
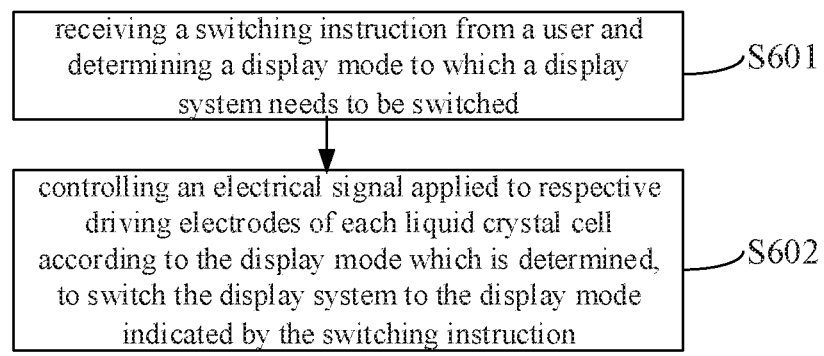
FIG. 6 is a flow chart of a display control method provided by some embodiments of the disclosure.

For example, some embodiments of the present disclosure also provide a display control method based on the above-mentioned display system, and the display control method can be implemented at least partially in software, hardware, firmware or any combination thereof for controlling the display system to realize the function of switching among display modes such as the two-dimensional plane display, the three-dimensional stereoscopic display, the anti-peep display and the like. For example, as shown in FIG. 6, the display control method provided by some embodiments of the present disclosure includes steps S601-S602. The display control method provided by some embodiments of the present disclosure will be described in detail below with reference to FIG. 6.

Step S601: receiving a switching instruction from a user and determining a display mode to which the display system needs to be switched; and Step S602: controlling an electrical signal applied to respective driving electrodes of each liquid crystal cell according to the display mode which is determined, to switch the display system to the display mode indicated by the switching instruction.

The display control method provided by some embodiments of the present disclosure can realized switching among various display modes by controlling the strip electrodes of each liquid crystal cell. For example, the mutual switching between the two-dimensional plane display and the three-dimensional stereoscopic display can be realized, the mutual switching between the two-dimensional plane display and the anti-peep display can be realized, and the mutual switching between the anti-peep display and the three-dimensional stereoscopic display can be realized. In addition, an anti-peep angle may be adjusted in the anti-peep display mode. After the number of the liquid crystal cells which is adopted and the setting positions of the liquid crystal cells are determined, the positions and/or widths of both the light-transmitting regions and the light-shielding regions formed on each liquid crystal cell may be adjusted by adjusting the electrical signal applied to respective strip electrodes of each liquid crystal cell, thereby changing the exit angles of the light emitted by the display device, thereby realizing various display modes.

For example, for the step S601, the switching instruction may include the mutual switching between the two-dimensional plane display and the three-dimensional stereoscopic display, the mutual switching between the two-dimensional plane display and the anti-peep display, the mutual switching between the anti-peep display and the three-dimensional stereoscopic display, etc. The specific instruction may be determined according to actual conditions, and the embodiments of the present disclosure are not limited to this case. In determining the display mode to be displayed, the controller device 13 provides the corresponding electrical signal to the liquid crystal cells according to the display mode to control each liquid crystal cell to form a completely transparent structure or the grating structure, so as to realize the switching among various display modes.

For example, for the step S602, in some examples, in a situation where it is determined that the display mode, to which the display system needs to be switched, is the two-dimensional plane display, controlling the electrical signal applied to the respective strip electrodes of each liquid crystal cell may specifically include: controlling the electrical signal applied to the respective strip electrodes so that respective liquid crystal cells are in the light-transmitting state.

Figure 7:
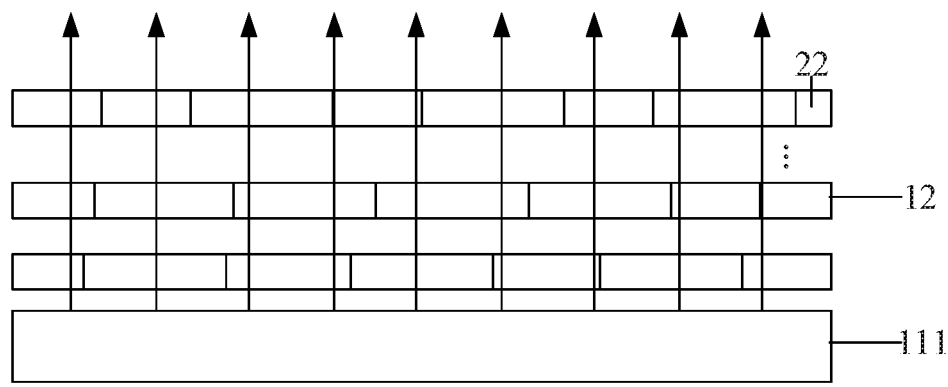
FIG. 7 is a schematic diagram of two-dimensional plane display provided by some embodiments of the disclosure.

For example, each layer of liquid crystal cell on the light-emitting side of the display device includes the polymer liquid crystal layer mixed with the black dye. Because both dye molecules and polymer liquid crystal molecules have dichroism and display obviously in the long axis direction of the molecular, the dye molecules and the polymer liquid crystal molecules can be applied with no voltage, so that the two types of molecules are randomly distributed and the liquid crystal cell exhibits a completely light-transmitting state. No electric field is applied to each liquid crystal cell on the light-emitting side of the display device, so that respective liquid crystal cells exhibit the completely light-transmitting state. That is, in this mode, each liquid crystal cell includes only the light-transmitting regions 22 and does not include the light-shielding regions. As a result, the light of the display picture of the display device 11 completely passes through each liquid crystal cell 12 as shown in FIG. 7, to realize two-dimensional plane display.

For example, for the step S602, in some examples, in a situation where it is determined that the display mode, to which the display system needs to be switched, is the three-dimensional stereoscopic display, controlling the electrical signal applied to the respective strip electrodes of each liquid crystal cell may specifically include: controlling the electrical signal applied to the respective strip electrodes, so that the at least two layers of liquid crystal cells form the light-transmitting regions 22 and the light-shielding regions 21, and the light-transmitting regions and the light-shielding regions are alternately arranged; and controlling each liquid crystal cell to switch between a left-eye mode and a right-eye mode at a set frequency that cannot be distinguished by the human eye.

For example, in a left-eye mode and a right-eye mode, orthographic projections of the light-transmitting regions of the at least two layers of liquid crystal cells on the display surface of the display device do not completely overlap each other; in the left-eye mode, a region covered by the emitted light of the display device at least partially overlaps a visual range of the left eye and does not overlap a visual range of the right eye; in the right-eye mode, a region covered by the emitted light of the display device at least partially overlaps the visual range of the right eye and does not overlap the visual range of the left eye.

Figure 8A:
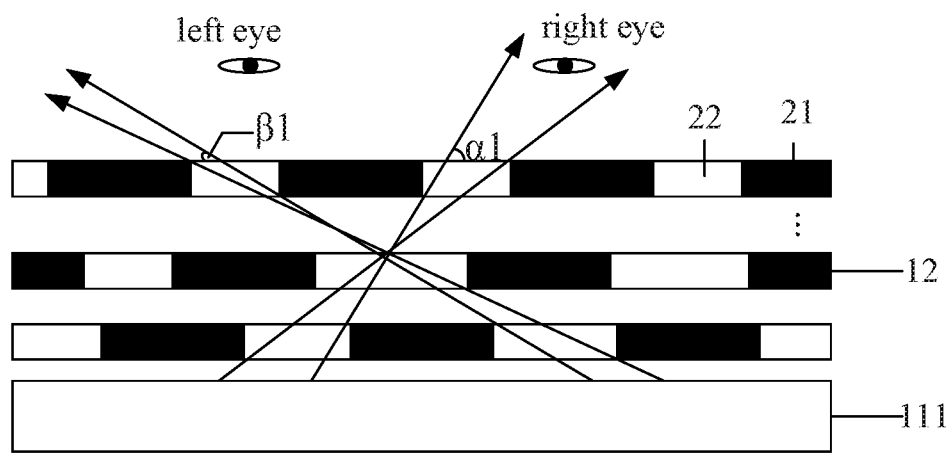
FIG. 8A is a schematic diagram of three-dimensional stereoscopic display provided by some embodiments of the disclosure.
Figure 8B:
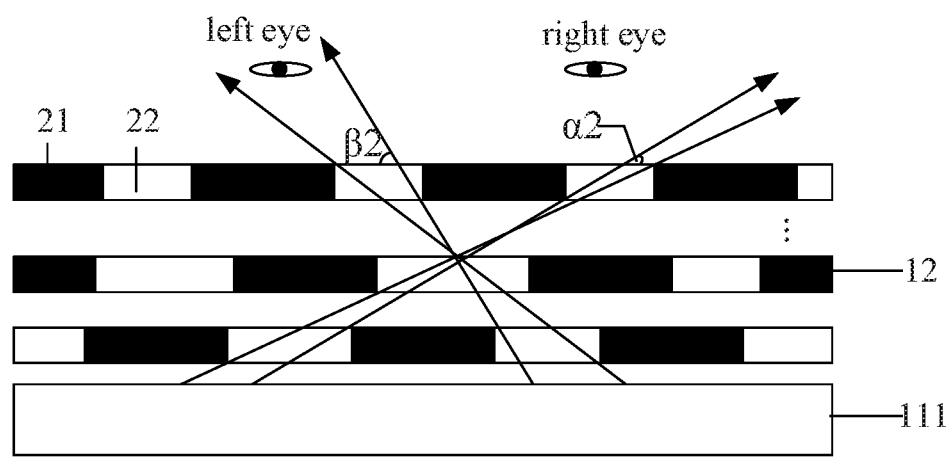
FIG. 8B is a schematic diagram of the three-dimensional stereoscopic display provided by other embodiments of the disclosure.

Specifically, the three-dimensional stereoscopic display of the display system utilizes the principle that parallax is generated by a left-eye viewed image and a right-eye viewed image to fuse into a three-dimensional stereoscopic image in a brain. In actual operation, the left-eye mode and the right-eye mode can be quickly switched for the two eyes; upon switching at a frequency that cannot be distinguished by the human eyes, the human eyes do not sense the flicker of the picture and the stereoscopic image is fused in the brain. For example, in the left-eye mode, the right eye cannot observe the display image; in the right-eye mode, the left eye cannot observe the display image. Referring specifically to FIGS. 8A and 8B, FIG. 8A shows an exit range of the light of the display system in the right-eye mode, and FIG. 8B shows the exit range of the light of the display system in the left-eye mode. The arrangements of the light-transmitting regions 22 and the light-shielding regions 21 of each liquid crystal cell are different in the two modes; by controlling the strip electrodes of each liquid crystal cell, the at least two layers of liquid crystal cells form the light-transmitting regions and the light-shielding regions, the light-transmitting regions and the light-shielding regions are alternately arranged, each of which region has a set width, and the liquid crystal cell after being applied with the electric signal forms the grating structure for controlling the exit direction of the light of the display device.

As shown in FIG. 8A, in a situation where a maximum value of an included angle between the emitted light of the display device toward the right eye and the display surface of the display device is $\alpha 1$, in a case where a region that can be covered by the portion of the emitted light, which an included angle between the portion of the emitted light and the display surface is smaller than $\alpha 1$, at least partially overlaps the visual range of the right eye, it is indicated that the right eye can receive the emitted light of the display device, that is, the right eye can view the display image of the display device; at this time, a maximum value of the included angle between the emitted light of the display device toward the left eye and the display surface is $\beta 1$, and a region that can be covered by a portion of the emitted light, which an included angle between the portion of the emitted light and the display surface is smaller than $\beta 1$, does not overlap the visual range of the left eye, it is indicated that the left eye cannot receive the emitted light of the display device, that is, the left eye cannot view the display image of the display device, thus realizing the display in the right-eye mode.

In switching from the right-eye mode to the left-eye mode, it is necessary to adjust the positions of the light-transmitting regions and the light-shielding regions of each liquid crystal cell. The arrangement mode, which is adjusted, of each liquid crystal cell is shown in FIG. 8B, a maximum value of the included angle between the emitted light of the display device toward the right eye and the display surface of the display device is $\alpha 2$, and in a case where a region that can be covered by a portion of the emitted light, which the included angle between the portion of the emitted light and the display surface is smaller than $\alpha 2$, does not overlap the visual range of the right eye, it is indicated that the right eye cannot receive the emitted light of the display device, that is, the right eye cannot view the display image of the display device; at this time, a maximum value of the included angle between the emitted light of the display device toward the left eye and the display surface is $\beta 2$, and in a case where a region that can be covered by a portion of the emitted light, which the included angle between the portion of the emitted light and the display surface is smaller than $\beta 2$, at least partially overlap the visual range of the left eye, it is indicated that the left eye can receive the emitted light of the display device, that is, the left eye can view the display image of the display device, thus realizing the display in the left-eye mode. In a situation where the left-eye mode and the right-eye mode are switched at the frequency that cannot be distinguishable by the human eye, the three-dimensional stereoscopic image can be viewed due to the persistence effect of human eyes' vision.

For example, for the step S602, in some examples, in a situation where it is determined that the display mode, to which the display system needs to be switched, is the anti-peep display, controlling the electrical signal applied to the respective strip electrodes of each liquid crystal cell may specifically include: controlling the electrical signal applied to the respective strip electrodes so that at least two layers of liquid crystal cells form the light-transmitting regions 22 and the light-shielding regions 21, the light-transmitting regions 22 and the light-shielding regions 21 are alternately arranged, and other liquid crystal cell is in a completely light-transmitting state. For example, overlapping regions are between orthographic projections of the light-transmitting regions 22 of the respective liquid crystal cells on the display surface of the display device.

Figure 9:
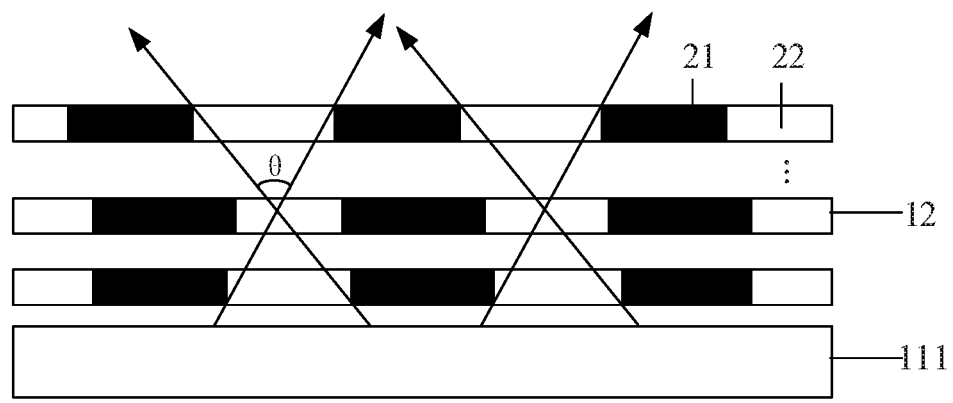
FIG. 9 is a schematic diagram of anti-peep display provided by some embodiments of the disclosure.

Specifically, the anti-peep display is used so that the human eye can view the display image of the display device within a set angle range (e.g., ±30°), and that the display image cannot be viewed beyond the angle range. Under normal circumstances, a visual angle is near a front-view angle and has a range that is not too large, that is to say, the exit of the light deviating from the front-view angle is controlled. In the embodiments of the present disclosure, as shown in FIG. 9, the electrical signal applied to the respective strip electrodes of each liquid crystal cell may be controlled so that at least two layers of liquid crystal cells form the light-transmitting regions 22 and the light-shielding regions 21, the light-transmitting regions 22 and the light-shielding regions 21 are alternately arranged, and other liquid crystal cell is in the completely light-transmitting state. The orthographic projections of the light-transmitting regions 22 in different layers of liquid crystal cells of the at least two layers of liquid crystal cells with the light-shielding regions 21 and the light-transmitting regions 22 on the display surface of the display device, need to have the overlapping regions, so that the emitted light of the display device can be transmitted outwards from the overlapping regions, and the visual angle is within the range of θ as shown in FIG. 9. By using the light-transmitting regions 22 and the light-shielding regions 21 formed by the at least two layers of liquid crystal cells to control the emitted light of the display device, a thickness of the light-shielding region can be increased, which effectively controls the exit of large-angle light far from a normal line, thus realizing a large-angle anti-peep display.

In the following, the display system including three layers of liquid crystal cells is taken as an example for illustration.

The control manner of the display system, which is used for the two-dimensional plane display, is the same as the control manner of the display system including the at least two layers liquid crystal cells, and can control the three layers of liquid crystal cells to be in the completely light-transmitting state to realize the two-dimensional plane display.

In a situation where the display system is used for the three-dimensional stereoscopic display, the electric signal applied to the respective strip electrodes may be controlled, so that the respective liquid crystal cells form the light-transmitting regions and the light-shielding regions, and the light-transmitting regions and the light-shielding regions are alternately arranged.

Figure 10A:
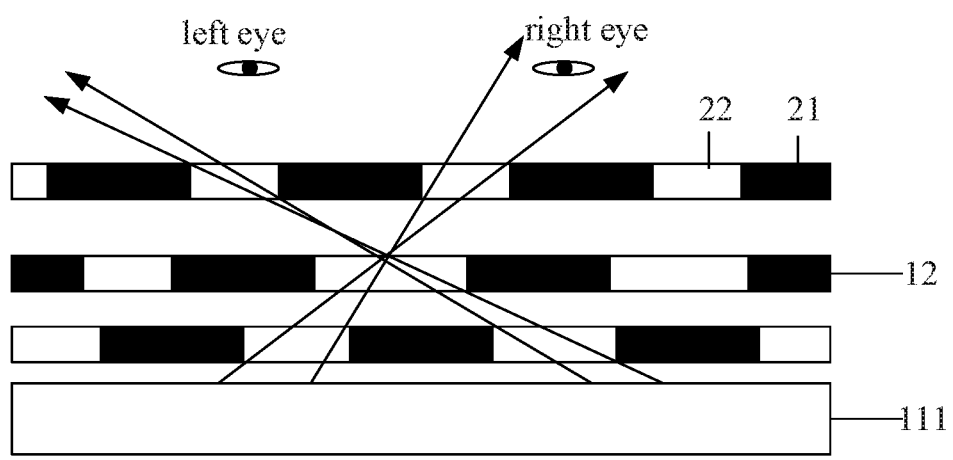
FIG. 10A is a schematic diagram of three-dimensional stereoscopic display provided by still other embodiments of the disclosure.
Figure 10B:
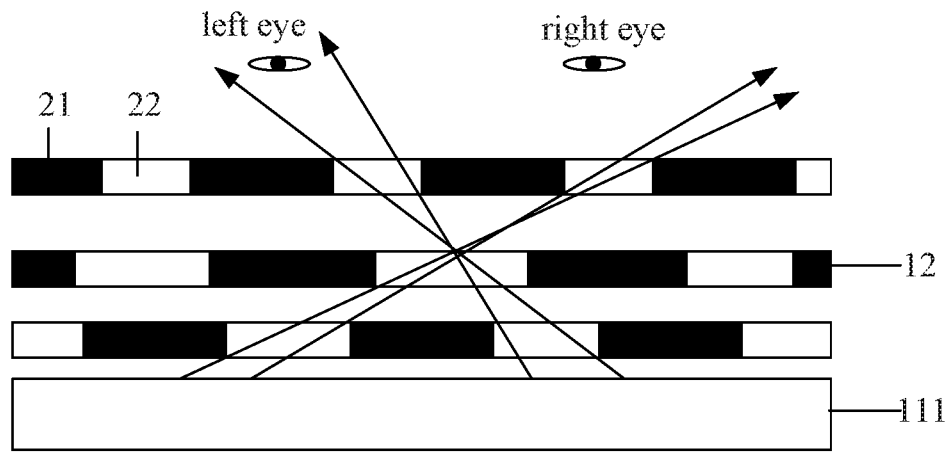
FIG. 10B is a schematic diagram of three-dimensional stereoscopic display provided by still other embodiments of the disclosure.

For example, the arrangement manner of the light-transmitting regions 22 and the light-shielding regions 21 formed by the three layers of liquid crystal cells is shown in FIGS. 10A and 10B. For example, FIG. 10A shows the arrangement manner of the light-transmitting regions 22 and the light-shielding regions 21 in the three layers of liquid crystal cells in the right-eye mode, and FIG. 10B shows the arrangement manner of the light-transmitting regions 22 and the light-shielding regions 21 in the three layers of liquid crystal cells in the left-eye mode. Specifically, for the arrangement manner of the light-transmitting regions 22 and the light-shielding regions 21 in the liquid crystal cells provided by some embodiments of the present disclosure, the width of the light-transmitting region 22 in the liquid crystal cell in the intermediate layer is larger than the width of the light-transmitting region 22 in each of the other two layers of liquid crystal cells, and the width of the light-shielding region 21 in the liquid crystal cell in the intermediate layer is larger than the width of the light-shielding region 21 in each of the other two layers of liquid crystal cells; orthographic projections of the light-transmitting regions 22 of adjacent two layers of liquid crystal cells respectively on the display surface of the display device do not completely overlap each other. For example, the width of the light-shielding region 21 may be determined according to a number of the strip electrodes included in the light-shielding region 21. For example, in an example, the light-shielding region 21 of the liquid crystal cell in the intermediate layer includes five continuous strip electrodes, for example, the electrical signal is applied to the five strip electrodes by the controller device 13 to form the light-shielding region. For example, the light-shielding region 21 in each of the remaining layers of liquid crystal cells includes three continuous electrodes, so that the width of the light-shielding region 21 in the liquid crystal cell in the intermediate layer is larger than the width of the light-shielding region 21 in each of the other two layers of liquid crystal cells. The formation principle of the light-shielding region 21 is similar and will not be described in detail below.

The light-transmitting regions 22 and the light-shielding regions 21 formed on each of the three liquid crystal cells form the grating structure. A grating period (a sum of the width of the light-shielding region 21 and the width of the light-transmitting region 22 adjacent to the light-shielding region 21) formed by the liquid crystal cell in the intermediate layer is larger than the grating period formed by each of the other two layers of liquid crystal cells, so that the exit direction of the emitted light can be roughly adjusted, and the exit direction of the emitted light can be further adjusted through the grating periods formed by the liquid crystal cells on an upper side and a lower side. Thus, only the right eye can view the display image in the right-eye mode as shown in FIG. 10A, and only the left eye can view the display image in the left-eye mode as shown in FIG. 10B. The stereoscopic image can be observed in the situation where the left-eye mode and the right-eye mode are switched at the frequency that cannot be distinguished by the human eye.

In specific applications, other arrangement modes can still be adopted to realize the three-dimensional stereoscopic display in the situation where the three layers of liquid crystal cells are adopted. The embodiments of the present disclosure are only for illustration and do not limit other arrangement rules for realizing the three-dimensional stereoscopic display.

Figure 11:
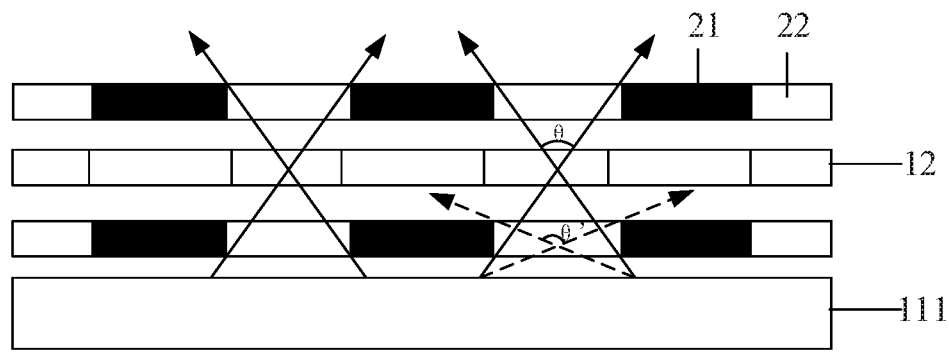
FIG. 11 is a schematic diagram of anti-peep display provided by other embodiments of the disclosure.

In the situation where the display system is used for the anti-peep display, the electric signal applied to the respective strip electrodes may be controlled so that the three layers of liquid crystal cells form the arrangement manner as shown in FIG. 11. For example, the liquid crystal cell in the intermediate layer is in the completely light-transmitting state, each of the other two layers of liquid crystal cells forms the light-transmitting regions 22 and the light-shielding regions 21, and the light-transmitting regions 22 and the light-shielding regions 21 are alternately arranged; orthographic projections of the light-transmitting regions 22 of the other two layers of liquid crystal cells except the liquid crystal cell in the intermediate layer on the display surface of the display device are exactly completely overlapped. The liquid crystal cell in the intermediate layer is controlled to be in the completely light-transmitting state, and the liquid crystal cell on the upper side and the liquid crystal cell on the lower side are controlled to control the exit direction of the light, which is equivalent to thickening the overall thickness of the liquid crystal cells and can more effectively control the emergent of large-angle light. As shown in FIG. 11, if only the layer of liquid crystal cell closest to the display device is used to control the angle of the emitted light of the display device, the anti-peep angle can be controlled to be within angle θ', and the anti-peep control in a small range near the front-view angle cannot be realized. In a situation where the liquid crystal cell on the upper side and the liquid crystal cell on the lower side are used to control the exit direction of the light, the anti-peep angle can be controlled to be within θ, and the anti-peep control for the emitted light with a large angle can be effectively carried out. Controlling the liquid crystal cell on the upper side and the liquid crystal cell on the lower side to have the same arrangement manner can reduce the complexity of control. In practical application, other manners can be used to control the arrangement manner of the liquid crystal cells, which is not limited here.

It should be noted that the flow of the display control method provided by some embodiments of the present disclosure may include more or less operations, and these operations may be performed sequentially or in parallel. Although the flow of the display control method described above includes a plurality of operations occurring in a specific order, it should be clearly understood that the order of the plurality of operations is not limited. The display control method described above may be executed once or multiple times according to predetermined conditions.

In the display control method provided by the above embodiments of the present disclosure, the electrical signal can be applied to the respective strip electrodes of each liquid crystal cell for control according to actual needs, so as to control the positions and widths of the light-transmitting regions and the light-shielding regions formed on each liquid crystal cell, thereby realizing switching among various display modes.

The following points need to be explained:

(1) The drawings of the embodiments of the present disclosure only refer to the structures related to the embodiments of the present disclosure, and other structures may refer to the general design.

(2) In case of no conflict, the embodiments of the present disclosure and the features in the embodiments can be combined with each other to obtain new embodiments.

What are described above is related to the illustrative embodiments of the disclosure only and not limitative to the scope of the disclosure; the scopes of the disclosure are defined by the accompanying claims.

What is claimed is:

1. A display system, comprising: a display device, three layers of liquid crystal cells on a light-emitting side of the display device, and a controller device,
   wherein the display device is configured to display a display picture;
   the three layers of liquid crystal cells are configured to control an exit angle of light of the display picture; and
   the controller device is configured to control positions and/or widths of both light-transmitting regions and light-shielding regions in each layer of liquid crystal cell in the three layers of liquid crystal cells to control a display mode of the display picture;
   wherein the controller device is configured to control the three layers of liquid crystal cells to form the light-transmitting regions and the light-shielding regions, the light-transmitting regions and the light-shielding regions are alternately arranged, and orthographic projections of the light-transmitting regions in two layers of liquid crystal cells of the three layers of liquid crystal cells, which are adjacent to each other, on a display surface of the display device do not completely overlap each other, so that the display mode is three-dimensional stereoscopic display;
   the controller device is configured to control widths of the light-transmitting regions of a liquid crystal cell in an intermediate layer to be larger than widths of the light-transmitting regions of liquid crystal cells in two layers other than the intermediate layer, and to control widths of the light-shielding regions of the liquid crystal cell in the intermediate layer to be larger than widths of the light-shielding regions of the liquid crystal cells in the two layers other than the intermediate layer.

2. A display control method of the display system according to claim 1, comprising:
   receiving a switching instruction from a user and determining the display mode to which the display system needs to be switched; and
   controlling an electrical signal applied to respective driving electrodes of each liquid crystal cell according to the display mode which is determined, to switch the display system to the display mode indicated by the switching instruction.

3. The display control method according to claim 2, wherein in a situation where the display mode, to which the display system needs to be switched, is three-dimensional stereoscopic display, controlling the electrical signal applied to the respective driving electrodes of each liquid crystal cell comprises:
   controlling the electrical signal applied to the respective driving electrodes, so that each of the three layers of liquid crystal cells forms the light-transmitting regions and the light-shielding regions, and the light-transmitting regions and the light-shielding regions are alternately arranged; and
   controlling each liquid crystal cell to switch between a left-eye mode and a right-eye mode at a set frequency,
   wherein in the left-eye mode and the right-eye mode, orthographic projections of the light-transmitting regions in different layers of liquid crystal cells of the three layers of liquid crystal cells on a display surface of the display device do not completely overlap each other.

4. The display control method according to claim 3, wherein
   in the left-eye mode, a region covered by emitted light of the display device at least partially overlaps a visible range of a left eye and does not overlap a visible range of a right eye; and
   in the right-eye mode, the region covered by the emitted light of the display device at least partially overlaps the visual range of the right eye and does not overlap the visual range of the left eye.

5. The display control method according to claim 2, wherein in a situation where the display mode, to which the display system is switched, is three-dimensional stereoscopic display, controlling the electrical signal applied to the respective driving electrodes of each liquid crystal cell comprises:
   controlling the electrical signal applied to the respective driving electrodes so that respective liquid crystal cells form the light-transmitting regions and the light-shielding regions, and the light-transmitting regions and the light-shielding regions are alternately arranged,
   wherein widths of the light-transmitting regions of a liquid crystal cell in the intermediate layer is larger than widths of the light-transmitting regions of liquid crystal cells in the two layers other than the intermediate layer, widths of the light-shielding regions of the liquid crystal cell in the intermediate layer is larger than widths of the light-shielding regions of the liquid crystal cells in the two layers other than the intermediate layer; orthographic projections of the light-transmitting regions of the liquid crystal cells in the two layers, which are adjacent to each other, on the display surface of the display device do not completely overlap each other.

6. The display system according to claim 1, wherein each layer of the three layers of liquid crystal cells comprises: two transparent electrode layers opposite to each other and a liquid crystal layer between the two transparent electrode layers,
wherein each of the two transparent electrode layers opposite to each other comprises a driving electrode, and the driving electrode is configured to be applied with an electrical signal to control the liquid crystal layer corresponding to the driving electrode to switch between a light-transmitting state and an opaque state, and to form the light-transmitting regions and the light-shielding regions of each layer of liquid crystal cell.

7. The display system according to claim 6, wherein the driving electrode comprised in each of the two transparent electrode layers comprises a plurality of strip electrodes extending in a same direction.

8. The display system according to claim 6, wherein the liquid crystal layer is a polymer liquid crystal layer comprising a black dye,
the polymer liquid crystal layer comprising the black dye is in the light-transmitting state in a situation of being applied without an electric field, and is in the opaque state in a situation of being applied with an electric field.

9. The display system according to claim 1, wherein a first set interval is between the display device and the three layers of liquid crystal cells and a second set interval is between adjacent layers of liquid crystal cells of the three layers of liquid crystal cells.

10. The display system according to claim 1, wherein the display device comprises a backlight module and a display panel on a light-emitting side of the backlight module;
the three layers of liquid crystal cells are on a side of the display panel facing away from the backlight module or between the backlight module and the display panel.

11. The display system according to claim 1, wherein the display device is an organic light-emitting diode display device or a liquid crystal display device.

12. A display system, comprising: a display device, at least three layers of liquid crystal cells on a light-emitting side of the display device, and a controller device,
wherein the display device is configured to display a display picture;
the at least three layers of liquid crystal cells are configured to control an exit angle of light of the display picture; and
the controller device is configured to control positions and/or widths of both light-transmitting regions and light-shielding regions in each layer of liquid crystal cell in the at least three layers of liquid crystal cells to control a display mode of the display picture;
wherein the controller device is configured to control n layers of liquid crystal cells of the at least three layers of liquid crystal cells to form the light-transmitting regions and the light-shielding regions, the light-transmitting regions and the light-shielding regions are alternately arranged, and each liquid crystal cell, except for the n layers of liquid crystal cells, is in a completely light-transmitting state, and overlapping regions are between orthographic projections of the light-transmitting regions in different layers of liquid crystal cells of the n layers of liquid crystal cells on a display surface of the display device, so that the display mode is anti-peep display;
n is an integer greater than or equal to 2.

13. The display system according to claim 12, wherein the display system comprises three layers of liquid crystal cells, and the controller device is configured to control a liquid crystal cell in an intermediate layer to be in the completely light-transmitting state, so that each of the liquid crystal cells in two layers other than the intermediate layer comprises the light-transmitting regions and the light-shielding regions, and the light-transmitting regions and the light-shielding regions are alternately arranged,
wherein the orthographic projections of the light-transmitting regions of the liquid crystal cells in the two layers other than the intermediate layer on the display surface of the display device exactly completely overlap each other.

14. A display control method of the display system according to claim 12, comprising:
receiving a switching instruction from a user and determining the display mode to which the display system needs to be switched; and
controlling an electrical signal applied to respective driving electrodes of each liquid crystal cell according to the display mode which is determined, to switch the display system to the display mode indicated by the switching instruction,
wherein in a situation where the display mode, to which the display system is switched, is anti-peep display, controlling the electrical signal applied to the respective driving electrodes of each liquid crystal cell comprises:
controlling the electrical signal applied to the respective driving electrodes, so that each of n layers of liquid crystal cells of the at least three layers of liquid crystal cells forms the light-transmitting regions and the light-shielding regions, the light-transmitting regions and the light-shielding regions are alternately arranged, and respective liquid crystal cells, except for then layers of the liquid crystal cells, are in a completely light-transmitting state,
wherein overlapping regions are between orthographic projections of the light-transmitting regions in different layers of liquid crystal cells of the three layers of liquid crystal cells on a display surface of the display device.

15. A display control method of the display system according to claim 12, comprising:
receiving a switching instruction from a user and determining the display mode to which the display system needs to be switched; and
controlling an electrical signal applied to respective driving electrodes of each liquid crystal cell according to the display mode which is determined, to switch the display system to the display mode indicated by the switching instruction,
wherein the display system comprises three layers of liquid crystal cells and in a situation where the display mode, to which the display system is switched, is anti-peep display, controlling the electrical signal applied to the respective driving electrodes of each liquid crystal cell comprises:
controlling the electrical signal applied to the respective driving electrodes, so that a liquid crystal cell in an intermediate layer to be in a completely light-transmitting state, and that each of liquid crystal cells in two layers other than the intermediate layer comprises the light-transmitting regions and the light-shielding regions, and the light-transmitting regions and the light-shielding regions are alternately arranged,
wherein orthographic projections of the light-transmitting regions of the liquid crystal cells in the two layers other than the intermediate layer on a display surface of the display device exactly completely overlap each other.

* * * * *